Dec. 4, 1923.

B. A. FISKE

READING MACHINE

Filed June 17, 1920    3 Sheets-Sheet 1

Inventor
Bradley A. Fiske
By his Attorney
Frank L. Dyer

Dec. 4, 1923.

B. A. FISKE

READING MACHINE

Filed June 17, 1920   3 Sheets-Sheet 2

1,476,290

Inventor
Bradley A. Fiske
By his Attorney
Frank C. Roe

Dec. 4, 1923.
B. A. FISKE
1,476,290
READING MACHINE
Filed June 17, 1920 3 Sheets-Sheet 3
Fig. 7.
Fig. 8.
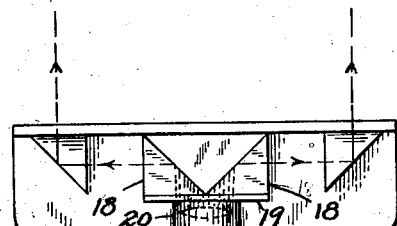
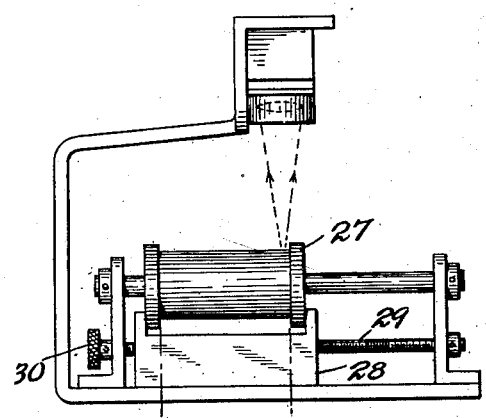
Fig. 10.
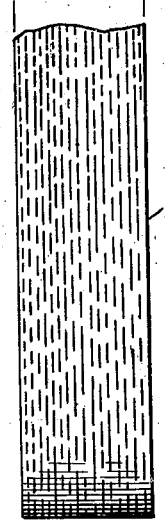
Fig. 9.
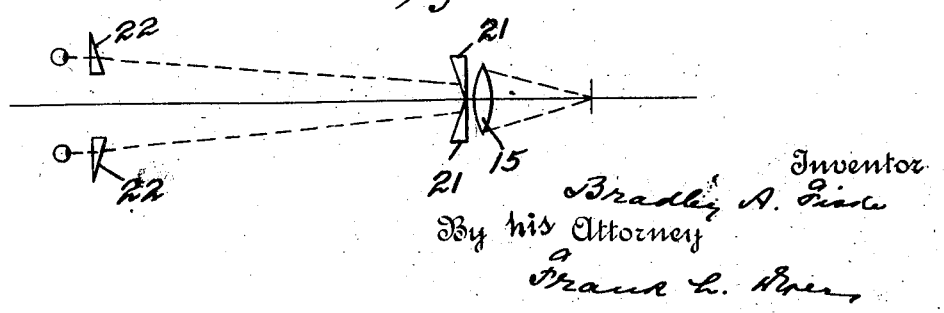
Inventor
Bradley A. Fiske
By his Attorney
Frank L. Dyer Patented Dec. 4, 1923.

1,476,290

UNITED STATES PATENT OFFICE.

BRADLEY A. FISKE, OF NEW YORK, N. Y.

READING MACHINE.

Application filed June 17, 1920. Serial No. 389,691.

*To all whom it may concern:*

Be it known that I, BRADLEY A. FISKE, a citizen of the United States, residing in the borough of Manhattan, city, county, and State of New York, and whose post-office address is No. 128 West 59th St., New York city, have invented certain new and useful Improvements in Reading Machines, of which the following is a full, clear, and exact description.

My invention relates to an improved device to which I have applied the name reading machine, and which is intended principally as a substitute for books, magazines, pamphlets, newspapers, or any other vehicle by which printed words are read at the present time.

The object of my invention primarily is to secure economy of paper by providing means whereby small and preferably microscopic characters impressed on sheets of paper or similar material may be used. A further object is to permit the small characters referred to, to be read without any undue strain on the eyes of the reader.

These objects are achieved by the employment of a suitable lens system by which the characters may be properly magnified so as to be easily read and by providing a suitable carrier for the sheet on which the characters are impressed and by which the characters will be moved successively before the lens system at a fixed distance somewhat less than its focal distance. The lens system is preferably so arranged that both eyes are directed into suitable eye pieces, so that the lines of vision are parallel, thus doing away with the present necessity of converging the two eyes on a single point with its consequent muscular strain.

The carrier by which the sheet is thus moved with respect to the lens system may be of any suitable character, preferably a cylinder, to which the sheet is applied in such a way that the characters are arranged on a continuous spiral line similar to a phonograph record, whereby all the characters on the sheet may be successively brought into view by slowly rotating the cylinder and at the same time feeding the lens system longitudinally thereof at a rate corresponding to the pitch of the printed line. Instead of impressing the characters on flat sheets, which are supported on a cylindrical carrier as explained, the sheets may be in the form of endless strips or belts on which the characters are arranged spirally or in lines parallel to the axis of the sheet. If the spiral arrangement is used provision is made for moving the lens system cross-wise of the belt at a rate corresponding to the pitch of the spiral in the same way as when the sheets are supported by a cylindrical carrier. When the characters are arranged in lines parallel with the axis of the strip the belt will be moved with respect to the lens system until all the characters in a line have been read, whereupon the lens system will be moved the distance between two of the lines so as to permit the characters on the succeeding line to be read.

The method employed for impressing the characters on the sheets may be of any suitable kind, provided the characters are made sufficiently small and clear for the purpose. A convenient method is that of photographic reduction, since in this way I am able to secure on a sheet of moderate size, say six inches square, many thousands of words sufficiently clear to be read easily by a simple system of lenses or reflectors. In this way, on a sheet the size indicated, it is possible to secure by photographic reduction the entire contents of a book of average size and with the characters of such clearness as to be easily read.

The characters are successively brought into view by slowly moving the sheet carrier and this may be done by means of a small motor for the purpose, although I prefer to operate the carrier by the reader's hand turning a small hand wheel, since the movement is necessarily slow and may be performed accurately and without fatigue.

In order that my invention may be better understood, attention is directed to the accompanying drawings forming a part of this specification, and in which—

Fig. 7 is a side elevation of a modified form of the invention in which the sheet is in the form of an endless strip or band showing the characters arranged spirally thereon;

Fig. 8 is a front elevation of the same;

Fig. 9 is a diagram of a modification of the lens system; and

Fig. 10 is a similar diagram of a further modification of the lens system.

In all of the above views corresponding parts are represented by the same reference numerals.

Figure 1:
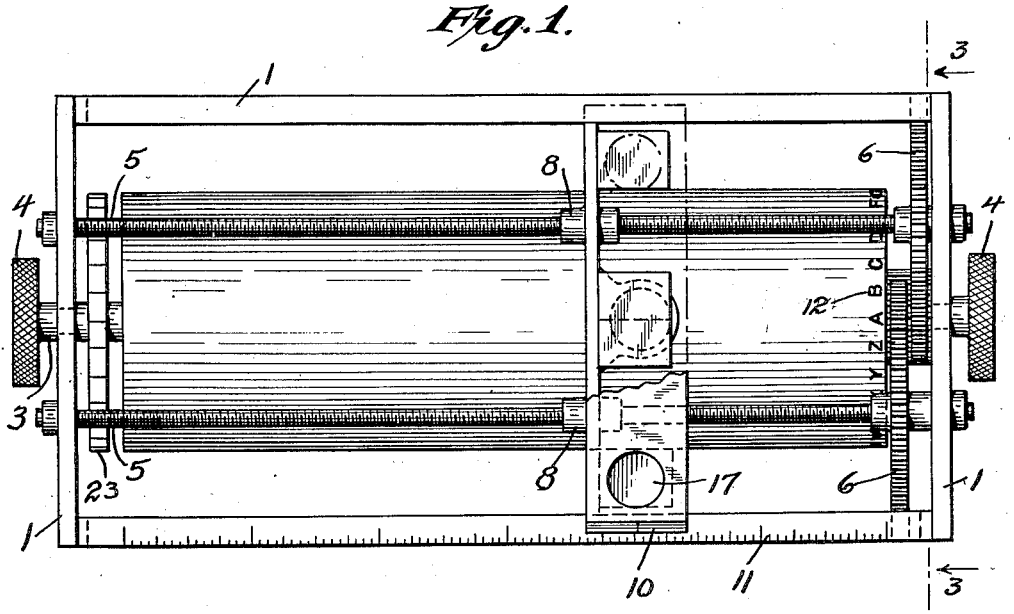
Fig. 1 is a plan of my improved reading machine in its preferred form partly broken away for clearness of illustration.

Referring first to the preferred embodiment of the invention shown in Figs. 1 to 5, inclusive, a suitable metal framework 1 is provided supporting a cylindrical sheet carrier 2 on a suitable shaft 3 to the ends of which are secured milled wheels 4 by which the sheet carrier may be slowly rotated by the reader. Two parallel screw threaded shafts 5 are mounted in the framework and are rotated by gears 6—6, meshing with a pinion 7 on the carrier shaft 3. Mounted upon the threads 5—5 are two collars 8—8 carried at the lower end of a traveling frame 9 supporting the lens system. This traveling frame 9 is provided with an index 10 cooperating with a scale 11 on one of the members of the frame 1 and the cylindrical carrier 2 is provided at one end with a series of reference letters 12, so that by noting the position of the traveling frame with respect to the scale 11 and the reference letters 12, the reader can direct the lens system so that it may focus on any desired point on the cylinder and thus permit any desired part of the sheet to be read.

The lens system by which the reading is affected may be of any suitable character and may differ widely in organization and arrangement.

Figure 2:
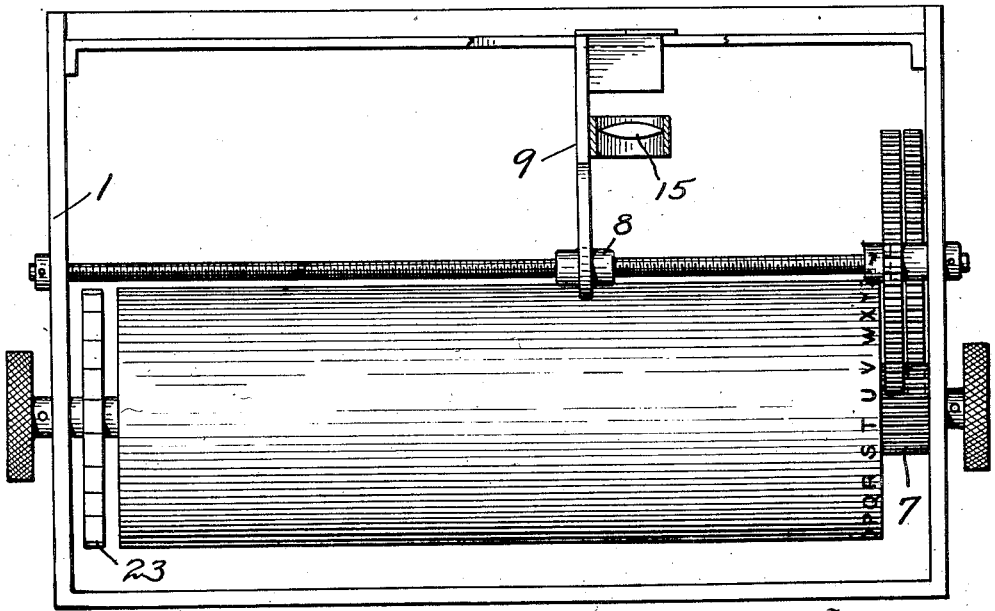
Fig. 2 is a side elevation of the same, partly in sections.
Figure 3:
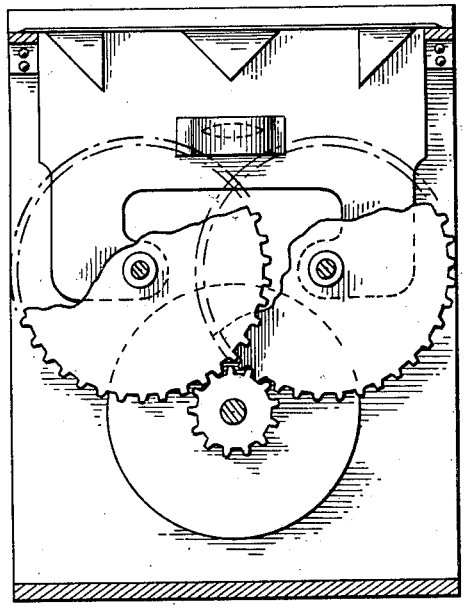
Fig. 3 is a vertical cross section on the line 3—3 of Fig. 1.
Figure 6:
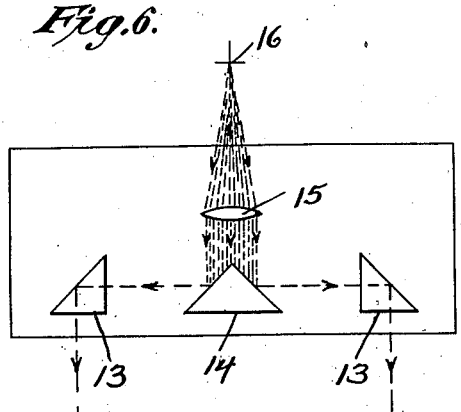
Fig. 6 is a diagram illustrating the preferred arrangement of lens system and showing the paths of the light rays.
Figure 4:
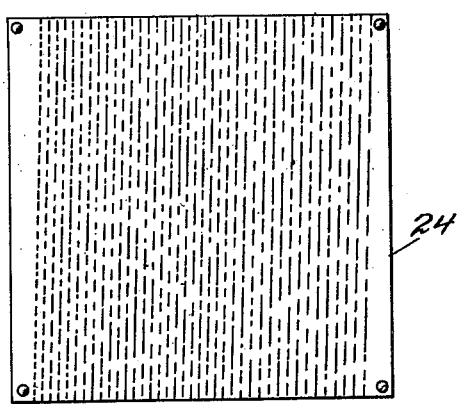
Fig. 4 is a plan of a paper sheet on a reduced scale illustrating the spiral arrangement of the printed lines, the characters being conventionally illustrated by dots and dashes.
Figure 5:
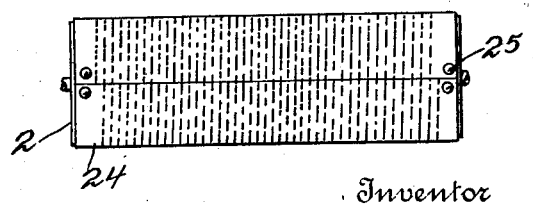
Fig. 5 is a detailed elevation of the cylinder constituting the preferred form of sheet carrier with the sheet thereon and showing the spiral arrangement of the printed lines.

Preferably the lens system is so constructed that while permitting the necessary enlargement to be secured, it will also enable both eyes to be used while permitting parallel vision. The lens system shown in Figs. 1 to 3 is illustrated diagrammatically in Fig. 6. It comprises two oppositely placed prismatic reflectors 13—13, a prism 14 having two polished reflecting surfaces as shown, and a single lens 15, whereby the light beam from the focal point 16 passing through the lens 15 will be split as shown, one-half passing to one of the reflectors 13 and the other half to the other reflector 13. In this way a character occupying a position somewhat within the focal point 16 will be read by both eyes, while at the same time the lines of vision of both eyes will be parallel. Any usual arrangement familiar to the optician may be employed for properly focusing the lens 15 and for adjusting the reflectors 13 to accommodate the reader's eyes. Two openings or eye pieces 17 in the traveling frame 9 immediately above the reflectors 13 permit the images in said reflectors to be seen by the reader. Instead of using a prism 14 with two reflecting surfaces, as shown in Figs. 3 and 6, I prefer to use the optical equivalent illustrated in Fig. 8, wherein two prisms 18 are employed cemented to a glass plate 19 by which the prisms will be firmly and rigidly supported. To provide for further compactness the holder 20 carrying the lens 15 may be cemented to the plate 19, as shown in this figure. A further modification of the lens system is shown in Fig. 9, in which refraction of light is utilized and the reflectors are omitted. With this modification, a pair of prisms of small angle 21 are located immediately behind the lens 15 and two other prisms 22, also of small angle, are arranged to straighten the two light beams and cause them to assume parallel paths as shown. The modification shown in Fig. 10 will be immediately obvious, since it corresponds precisely to Fig. 6, except that two lenses 15' are employed instead of a single lens. The various lens systems illustrated are merely typical of suitable arrangements permitting observation by both eyes, securing proper magnification and obtaining the desired parallelism of the light beams. It will be understood, of course, that any suitable lens system can be employed for the purpose.

In Figs. 1 and 2 I show a polygonal faced wheel 23 mounted on the shaft 3. If desired, the indicating letters 12 may be carried on the facets of the wheel 23 instead of on the cylindrical carrier 2.

The characters to be read are impressed by any suitable method on a sheet of paper or other material. When a cylindrical carrier is employed as in Figs. 1 to 3, this sheet 24 (see Fig. 4) is of a width to fit the longitudinal diameter of the cylinder and of a length to exactly fit its circumference, so that when the sheet is placed on the cylinder 2 (see Fig. 5) the printed matter will constitute a single continuous spiral line. Any suitable device may be employed for securing the sheet 24 on the carrier 2. For instance, snap catches 25 similar to those employed with gloves or for detachable collar buttons, comprising a headed shank with which cooperates a suitable socket, may be conveniently employed for the purpose.

The characters to be read are impressed on the sheet 24 in any suitable way, but the art of photographic reduction provides the very simple and effective method by which this may be done. The original characters may be printed from type on a sheet of the desired size with the lines arranged at the desired angle, and by means of photography an enormously reduced image of the original master may then be taken from which a positive print may be obtained in the usual way, of the size corresponding to the sheet 24.

In operation, the sheet 24 having been secured to the carrier 2, the traveling frame 9 will be moved so as to focus the lens at the commencement of the line. By means of the lens system employed the characters thereof will be appropriately magnified and viewed by both eyes as explained. By now slowly turning the cylinder the characters will progress before the eyes so as to be read, and at the same time by means of the threaded shaft 5 the traveling frame will progress longitudinally so as to always keep the characters in view, and thus permit the entire sheet to be read.

When the sheet has thus been read it may be removed and the next sheet placed in position. The traveling frame may now be returned to its initial position either by reversing the rotation of the cylinder so as to gradually screw the frame backwards, or instead a device may be employed similar to that used with photographs, permitting a nut to be disengaged and allowing the frame to be moved back independent of the threads. With the modifications shown in Figs. 7 and 8, the sheet is in the form of an endless band or belt 26 made of paper or other suitable material carried by a pulley 27, so as to be movable with respect to the lens system as shown. The pulley 27 is moved longitudinally by means of a block 28 engaged by a screw 29 and operated by a milled wheel 30. With this modification, the belt 26 may be drawn slowly downwards by hand and at the same time the thread 29 be operated so as to keep the characters in the field of the lens system, or instead, as in Figs. 1 to 3, there may be a positive connection between the thread 29 and the carrier, whereby this adjustment will be always automatic. Although in Fig. 7 the characters are shown on the belt 26 as being spirally arranged so as to be present a single continuous line from one end to the other, it will be understood that the characters may be arranged in lines parallel with the axis of the paper so that when one line has been read the thread 29 may be turned to shift the next line into view.

Having now described my invention, what I claim as new therein and desire to secure by Letters Patent is as follows:

1. The art of providing reading matter for the public which consists in producing printed reading matter, comprising successive words requiring consecutive observation to present intelligible thought, in type decipherable by direct vision, reducing the printed matter photographically on a sheet in characters of microscopic size, and securing relative movement of the sheet carrying such microscopic characters with respect to a lens system, and at a fixed distance therefrom, whereby the microscopic characters will be sufficiently magnified as to be read by the observer, the relative movement being such as to result in the successive passage of the characters across the field of the lens system to permit the words to be consecutively read, substantially as set forth.

2. A reading machine comprising a sheet carrying reading matter in characters of microscopic size and comprising successive words requiring consecutive observation to present intelligible thought, and a lens system with respect to which the characters are moved so as to carry the reading matter consecutively across the field of the lens and arranged to permit the characters to be viewed successively with both eyes simultaneously, substantially as set forth.

3. A reading machine comprising a sheet of paper carrying characters of microscopic size constituting reading matter and comprising successive words requiring consecutive observation to present intelligible thought, a lens system and means for moving the characters past the lens system to carry the reading matter consecutively across the field thereof at such a fixed distance from it that the characters can be read, substantially as set forth.

4. A reading machine comprising a sheet carrying reading matter in characters of microscopic size, and constituting a continuous spiral line of words requiring to be read consecutively to secure intelligible thought, and a lens system for successively viewing the characters and magnifying the same, and permitting consecutive observation of the words constituting the reading matter by both eyes simultaneously, substantially as set forth.

5. A reading machine comprising a sheet carrying reading matter in characters of microscopic size and constituting a continuous spiral line of words requiring to be read consecutively to secure intelligible thought, and a lens system for successively viewing the characters and magnifying the same, permitting consecutive observation of the words constituting the reading matter, said lens system being movable cross-wise of the sheet at a rate corresponding to the pitch of said line, substantially as set forth.

6. A reading machine, comprising a sheet carrying characters of microscopic size thereon in a single continuous spiral line, a lens system permitting magnified observation of the characters simultaneously by both eyes, means for moving the characters successively across the field of the lens system, and means for moving the lens system transversely of the sheet at a rate corresponding to the pitch of said line, substantially as set forth.

7. A reading machine, comprising a sheet carrying characters of small size arranged in a single continuous spiral line, a carrier for the sheet, a lens system by which the characters are observed and magnified, and with respect to which the sheet carrier is movable, means for moving the lens system transversely of the sheet, and an index and scale for determining the position of the sheet with respect to the lens system, substantially as set forth.

This specification signed and witnessed this 14th day of June, 1920.

BRADLEY A. FISKE.

Witnesses:
CHARLES C. MARSHALL,
FRANK L. DYER.